United States Patent
Paatzsch et al.

(10) Patent No.: US 8,267,611 B2
(45) Date of Patent: Sep. 18, 2012

(54) OPTICAL STRUCTURE COMPRISING ELASTIC SUSPENSION AND METHOD OF PRODUCING SUCH A STRUCTURE

(75) Inventors: Thomas Paatzsch, Mainz (DE); Ingo Smaglinski, Mainz (DE); Martin Popp, Mainz (DE); Thomas Petigk, Rüsselsheim (DE)

(73) Assignee: Cube Optics AG, Mainz (DE)

( * ) Notice: Subject to any disclaimer, the term of this patent is extended or adjusted under 35 U.S.C. 154(b) by 660 days.

(21) Appl. No.: 12/089,783

(22) PCT Filed: Sep. 21, 2006

(86) PCT No.: PCT/EP2006/066609
§ 371 (c)(1),
(2), (4) Date: Jun. 23, 2008

(87) PCT Pub. No.: WO2007/042385
PCT Pub. Date: Apr. 19, 2007

(65) Prior Publication Data
US 2008/0251683 A1    Oct. 16, 2008

(30) Foreign Application Priority Data
Oct. 14, 2005 (DE) .......................... 10 2005 049 731

(51) Int. Cl.
*F16M 13/00* (2006.01)
(52) U.S. Cl. .......................................... 403/30
(58) Field of Classification Search ............ 403/30, 403/220; 248/346.01, 548, 560, 160, 54
See application file for complete search history.

(56) References Cited

U.S. PATENT DOCUMENTS

| | | | |
|---|---|---|---|
| 5,392,662 A * | 2/1995 | Jadrich et al. | 74/89.36 |
| 5,801,891 A * | 9/1998 | Lloyd | 359/871 |
| 6,022,005 A * | 2/2000 | Gran et al. | 267/136 |
| 6,560,002 B2 * | 5/2003 | Mori | 359/247 |
| 6,850,675 B1 * | 2/2005 | Calvet et al. | 385/52 |
| 6,870,632 B2 * | 3/2005 | Petasch et al. | 356/614 |
| 7,602,564 B2 * | 10/2009 | Torii et al. | 359/822 |
| 7,729,065 B2 * | 6/2010 | Schoeppach et al. | 359/819 |
| 7,760,452 B2 * | 7/2010 | Mizuno | 359/823 |
| 2002/0051303 A1 * | 5/2002 | Smaglinski | 359/728 |
| 2005/0069376 A1 * | 3/2005 | Blanding | 403/30 |
| 2005/0078386 A1 * | 4/2005 | Takabayashi | 359/819 |

FOREIGN PATENT DOCUMENTS

| | | |
|---|---|---|
| WO | 03027721 A2 | 4/2003 |
| WO | 2005033762 A2 | 4/2005 |

* cited by examiner

*Primary Examiner* — Joshua Kennedy
(74) *Attorney, Agent, or Firm* — Paul & Paul

(57) ABSTRACT

An optical structure comprising a first and a second component and a connecting element which connects the two components and which has at least two spring elements. The two components have an extremely high level of positional and angular accuracy relative to each other even with major fluctuations in temperature and each spring element has a spring constant at least twice as great in two respective mutually perpendicular spatial directions as in the third spatial direction perpendicular to the first two spatial directions, referred to as the elasticity direction, wherein the two spring elements have elasticity directions which do not extend parallel to each other.

25 Claims, 12 Drawing Sheets

OPTICAL STRUCTURE COMPRISING ELASTIC SUSPENSION AND METHOD OF PRODUCING SUCH A STRUCTURE

The present invention concerns a structure, in particular an optical structure, comprising a first and a second component and a connecting element which connects the two components. There are a large number of possible uses in which two components have to be oriented and fixed relative to each other at a certain spacing. Particularly in optics, optical components frequently have to be oriented relative to each other with an extremely high level of positional and angular accuracy and then fixed relative to each other in the oriented position in order to keep down for example aberration defects.

An example of such a structure is shown in DE 100 43 985. Here the spacing between two components is fixed by the one component being provided with four legs which are glued on to the other component. As however there are generally certain component tolerances, the two components have to be oriented relative to each other prior to being stuck together, and the consequence of that is that generally not all four legs stand in areal contact on the oppositely disposed component but in part are in only punctiform contact or do not touch at all. In the adjustment procedure therefore small adjustment gaps automatically arise between the legs and the oppositely disposed component. Fixing is effected here by an adhesive which surrounds the legs and inevitably also fills the corresponding adjustment gaps. In other words the adhesive is used here structurally as it bridges over small adjustment gaps, which admittedly initially allows exact orientation of the two components relative to each other but may possibly entail loss of adjustment because of a shrinkage process on the part of the adhesive when hardening.

In the case of the above-mentioned structures there is also the problem that the structure is frequently exposed to certain temperature fluctuations so that, particularly when the two components involve different thermal expansion, deviations from the exact position and angular orientation can occur due to a change in temperature. Furthermore loss of adjustment also occurs in the above-described 'structural' use of the adhesive as the adhesive generally presents an expansion characteristic upon changes in temperature, which differs from the components and the legs used.

Changes in temperature however not only result in a loss of adjustment but frequently and in particular in the case of the connecting procedure described in DE 100 43 985 they result in bending of at least one component. That is due to the quite rigid connection between the two components.

Taking that state of the art as its basic starting point the object of the invention is to provide a structure, in particular an optical structure of the kind set forth in the opening part of this specification, in which the two components have an extremely high level of positional and angular accuracy even with major fluctuations in temperature.

In accordance with the invention that object is attained in that the connecting element has at least two elastic elements or spring elements, wherein each spring element has greatly anisotropic elastic properties so that the spring constant thereof is at least twice as great in two respective mutually perpendicular spatial directions as in the third spatial direction perpendicular to the first two spatial directions, referred to as the elasticity direction, wherein the two spring elements have elasticity directions which do not extend parallel to each other.

In general the term spring constant or spring directional characteristic is used to denote the proportionality constant which relates the deflection of a linear spring to the deflection force resulting therefrom. In practice however linear springs are not easy to implement. The elastic elements or the spring elements can generally be deflected out of their rest position not only in one spatial direction but also in the other directions extending perpendicular thereto. The lower the spring constant, the correspondingly 'softer' is the spring element or the correspondingly more easily can the spring element be deflected out of the rest position. It is therefore assumed hereinafter that the spring elements which moreover can be implemented by any elastic element can be deflected in all spatial directions at least to a certain degree, in which respect however the spring constant in at least one direction is at most half as great as in the other directions. The spring elements therefore represent a comparatively 'soft' connection in one direction (that direction is referred to herein as the elasticity direction) while they represent a comparatively 'rigid' connection in the other directions. It will be appreciated that strictly speaking there is not a linear relationship between the deflection force and deflection. The spring constant is therefore only an approximation which however provides a very good description of the reality for small deflections with which the present invention is concerned.

Even if each non-parallel arrangement of the elasticity directions entails advantages in accordance with the invention, in particular when using only two spring elements, a substantially perpendicular arrangement of the two elasticity directions relative to each other is advantageous. The described measure provides that at least the angular accuracy remains relatively high when major changes in temperature are involved. In that respect each spring element serves to allow on the one hand the movement of the first component with respect to the second component, in particular upon a change in temperature, in one direction, referred to as the elasticity direction, to a limited extent, while a corresponding relative movement in the other directions extending substantially perpendicular thereto is prevented as far as possible. In that respect the elasticity direction in a preferred embodiment extends substantially parallel to the surfaces of the components, that are to be oriented relative to each other.

In a particularly preferred embodiment the elasticity directions of the two spring elements include an angle of between 50 and 130°, preferably between 70 and 110° and particularly preferably between 85 and 950. Basically an angle of about 90° is best as then a respective element affords the necessary elasticity in one direction and affords the necessary stability in the other direction.

When using substantially rigid connecting elements, as is usual in the state of the art, they also exert moreover a certain bending moment on at least one of the components if one of the components is increased or reduced in length relative to the other. The provision of a 'soft' direction by the connecting element means that the torque exerted on the components is markedly reduced, which leads to a higher level of angular accuracy.

Depending on the respective shape and size of the components it may be advantageous to use more than two spring elements with correspondingly anisotropic spring constants. When using three spring elements they can be for example arranged in such a way that two respective elasticity directions include an angle of between 100 and 140°.

In order to achieve extremely accurate positioning of a first component with respect to a second component and corresponding elastic support even when temperature differences occur with a high level of positioning and angular accuracy, a particularly preferred embodiment provides that there are four spring elements whose spring constant in two respective mutually perpendicular spatial directions is at least twice as great as the spring constant in the third spatial direction perpendicular to the first two spatial directions, referred to as the elasticity direction, and wherein all elasticity directions lie substantially in one plane. Particularly in regard to the orientation of optical components relative to each other they frequently have two surfaces which are to be oriented relative to each other. The spring elements are advantageously so oriented that the plane defined by the elasticity directions extends parallel to the surface of the component, that is to be oriented.

It is particularly advantageous if two of the four spring elements have substantially parallel elasticity directions and the spring elements of the other two of the four spring elements also have substantially parallel elasticity directions, wherein the elasticity directions of the first pair of spring elements include with the elasticity directions of the second pair of spring elements an angle of between 50 and 130°, preferably between 70 and 110° and particularly preferably between 85 and 95°.

In addition a particularly preferred embodiment provides that at least one pair of spring elements is so arranged that the elasticity directions thereof lie on the notional connecting line between the engagement points of the individual spring elements of the pair of spring elements on one of the components.

In a particularly preferred embodiment the connecting element can be formed integrally with one of the two components. That has the advantage that no bending moments occur by virtue of thermal fluctuations as then the component and the connecting element have the same thermal expansion coefficient.

The connecting element itself can be made in one piece or can comprise a plurality of portions. In principle therefore all spring elements can be of an integral nature. Instead however the connecting element can also comprise various separate spring elements.

A further particularly preferred embodiment provides that the first component has a surface facing towards the second component and one or more edge faces adjoining the surface, wherein the spring elements are connected to the edge face. In other words in accordance with the invention the spring elements do not engage the surface facing towards the second component, but instead engage the edge faces. That has in particular the advantage that the first component can be adjusted relative to the second component in a first step and then the spring elements can be fixed to the outwardly disposed edge faces of the component so that the adhesive used for fixing or the corresponding weld point does not structurally contribute to determining the spacing of the two components.

In addition a particularly preferred embodiment provides that the second component has a surface facing towards the first component and the connecting element is connected to the surface of the second component. In other words the connecting elements stands on the surface of the second component. For positioning the two components relative to each other the connecting element can firstly be freely displaced on the surface of the second component. In the next step the connecting element is then fixed on the surface of the second component.

The connecting element can be for example an etched portion. Etched portions can be inexpensively produced with a quite high level of precision.

It has been found that the spring elements are desirably of metal, even if in principle other materials can be used. Metal exhibits typical elastic properties which are particularly suitable for the present invention. Desirably the metal is so selected that it exhibits approximately the same expansion characteristic as the second component. Stated more precisely it is advantageous if the volume expansion coefficient of the spring elements or the connecting element differs from that of the second component at 25° C. by not more than 20%, preferably by not more than 10% and particularly preferably by not more than 5%.

In addition the volume expansion coefficient of the spring elements should be as low as possible, preferably less than 0.02 and particularly preferably less than 0.01 $K^{-1}$ at 25° C. That ensures that the spacing between the two components changes only slightly upon a change in temperature.

In a further particularly preferred embodiment the spring elements are made from a material whose modulus of elasticity is at least 1000 times greater, preferably at least 2000 times greater and particularly preferably at least 5000 times greater than the maximum elastic tensile strength.

It has been found that the spring constant in the 'soft' direction or the elasticity direction, in particular for optical uses, is less than 40 N/mm, preferably less than 25 N/mm and particularly preferably less than 15 N/mm.

Even if in principle all different modes of connection between the connecting element on the one hand and the first or second component on the other hand are possible, an adhesive connection or a weld, preferably an adhesive connection, has proven to be particularly well handleable. In particular adhesive and welding afford stepless adjustability of the position of the two components relative to each other.

In a first embodiment the connecting element comprises a substantially square base surface which is connected to the surface of the second component and four prong-shaped spring elements which are angled with respect thereto and which are connected to the edge face of the first component. Such a connecting element can be produced for example integrally from metal in the form of an etched portion, wherein the individual prong-shaped spring elements are then angled at about 90° to the square base surface. In addition it is desirable if the square base surface has a substantially centrally arranged opening which is possibly also square. It will be appreciated that the base surface and the opening possibly provided can also be of a different shape, depending on the respective situation of use.

Alternatively a further embodiment of a connecting element has proved its worth, in which it comprises a leg frame and four prong-shaped spring elements extending therefrom. In that case the leg frame is placed on the surface of the second component while the prong-shaped spring elements extending therefrom engage the edge face of the second component.

It is particularly desirable if the prong-shaped spring elements have a contact portion which comes into contact with the first component and a portion of a thickness reduced in relation to the contact portion. That improves the spring properties.

The present invention further concerns a method of producing a structure according to the invention.

Further advantages, features and possible uses of the present invention will be apparent from the description hereinafter of some preferred embodiments. In the drawings:

DETAILED DESCRIPTION OF THE INVENTION

Figure 1:
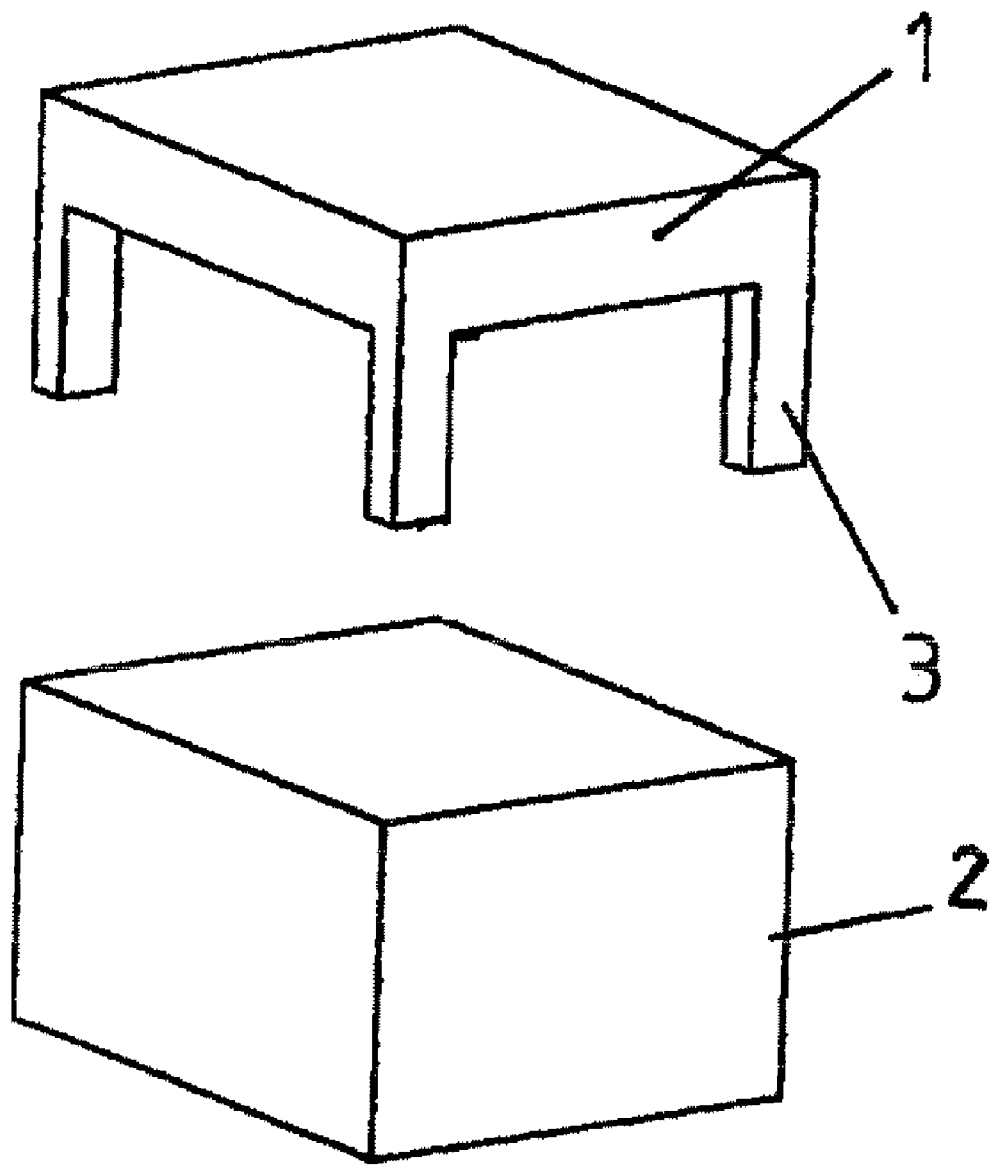
FIG. 1 shows a structure by way of example from the state of the art prior to connection of the two components.

FIG. 1 shows an exploded view of a structure in accordance with the state of the art. The Figure shows a first component 1, a second component 2 and a connecting element 3. The connecting element 3 is here integrally fixed to the first component 1 and comprises four spacer legs extending from the component 1 in the direction of the component 2. To position the component 1 relative to the component 2 the spacer legs 3 are of such a nature that they approximately correspond to the desired spacing between the component 1 and the component 2. To exactly position and fix the two components 1, 2 relative to each other, in a first step the component 1 is oriented with respect to the component 2 in such a way that the relative positions and the angular orientation are correct. In general then at least one of the spacer legs 3 will be placed directly on the surface of the second component 2. Nonetheless component tolerances mean that a small gap will remain in the case of some of the spacer legs 3. For fixing purposes the spacer legs 3 are fixed on the top side of the component 2 by adhesive. In that respect the adhesive used will also fill the remaining gap spacings. In the final condition therefore the hardened adhesive is used structurally as it also determines the spacing between the component 1 and the component 2. The spacer legs here are of a square profile and are substantially rigid.

Figure 2:
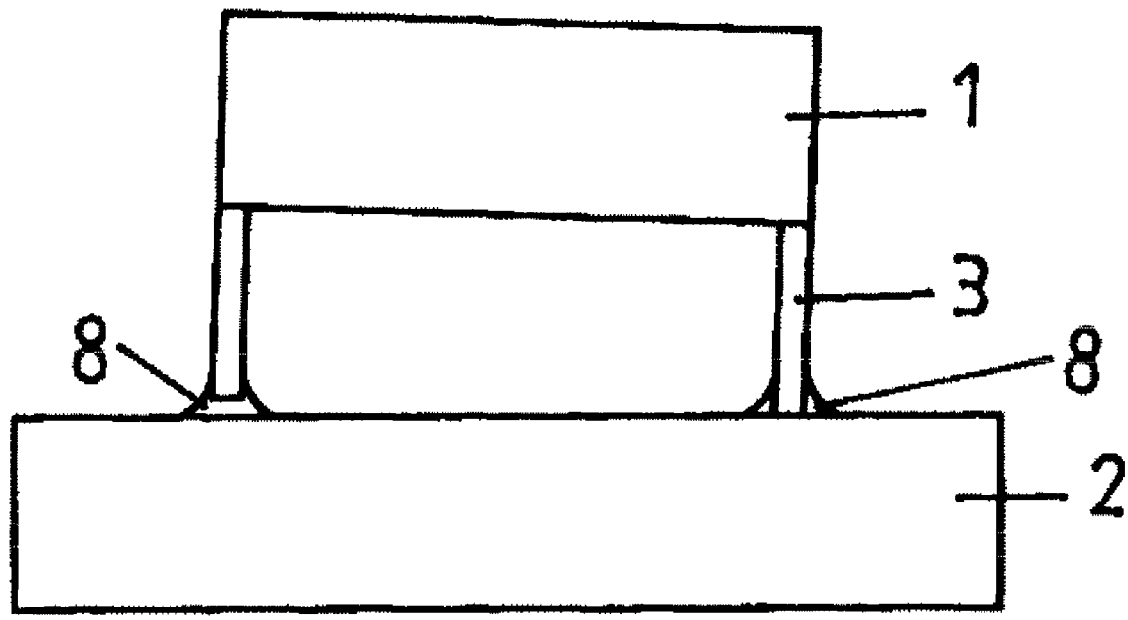
FIG. 2 shows a diagrammatic view of a structure from the state of the art.

That will be particularly clear from FIG. 2 which is a diagrammatic view showing the principle of the connecting elements used hitherto. It will be clearly seen here that the component 1 sits with the right spacer leg 3 on the second component 2 while exact positioning of the first component 1 relative to the second component 2 makes it necessary for a gap to be present between the left-hand spacer leg 3 and the second component 2. Adhesive 8 is then used for fixing the two components and the adhesive 8 then bridges over the gap between the left-hand spacer leg 3 and the second component 2. It will be immediately seen that, in the situation where shrinkage of the adhesive component occurs upon hardening of the adhesive 8, that possibly again alters the previously achieved positional and angular adjustment. In addition the connection which is shown in FIGS. 1 and 2 and which substantially corresponds to that described in DE 100 43 985 is relatively rigid. Upon a change in temperature therefore stresses occur within the components, and those stresses become correspondingly greater, the greater the difference to which the components expand upon a change in temperature. Particularly in the case of optical structures which require an angular accuracy of less than 0.5 mrad the known connecting procedure can be used only when all materials used have an equal coefficient of expansion or the structure is temperature-stabilised.

Figure 3:
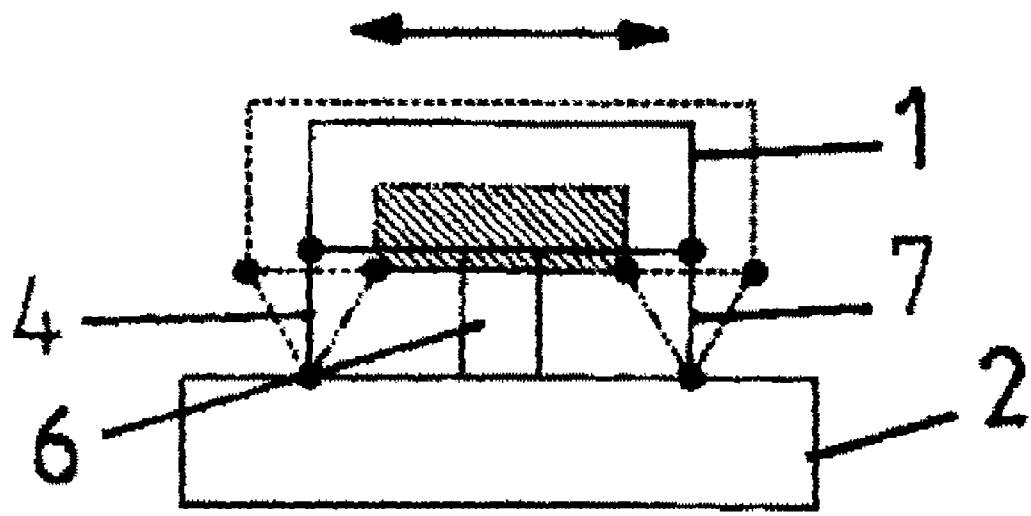
FIGS. 3 and 4 show diagrammatic views of the processes involved in a change in temperature in relation to a structure according to the invention.

FIG. 3 diagrammatically shows how a structure according to the invention behaves upon a change in temperature. In the structure according to the invention the first component 1 is connected to the component 2 by way of four spring elements (4, 5, 6, 7—wherein the fourth spring element 5 cannot be seen in FIG. 3 as it is behind the spring element 6). The two spring elements 4 and 7 have an elasticity direction which extends from left to right in FIG. 3. The other two spring elements 5 and 6 in contrast have an elasticity direction which is perpendicular to the plane of the drawing.

It has been assumed that the first component has a greater thermal expansion coefficient that the second component 2. For clarification purposes the first component 1 has been assumed to have a very high level of thermal expansion while the second component 2 involves no thermal expansion. It will be appreciated that the expansion effect is much less in practice and cannot be seen with the naked eye.

FIG. 3 shows the first component 1 once in its original size in a solid line, once at a higher temperature by means of a broken line and once at a lower temperature hatched and with a dash-dotted line. As the first component 1 expands more greatly than the second component 2, this inevitably means that the spring elements 4, 5, 6, 7 bend, in which respect only the bending of the two spring elements 4 and 7 can be seen in the illustrated view. That bending is diagrammatically illustrated by the additional spring elements shown in broken lines. As the first component 1 is fixed in the direction of the arrow by means of the spring elements 6 and 5 no change in the overall position of the first component 1 occurs in the direction of the arrow but the component 1 expands, starting from the fixing point of the spring elements 5, 6 on the first component uniformly towards the right and the left (or contracts). That ensures that the first component 1 does not tilt with respect to the second component 2 and fairly accurately retains its position.

Figure 4:
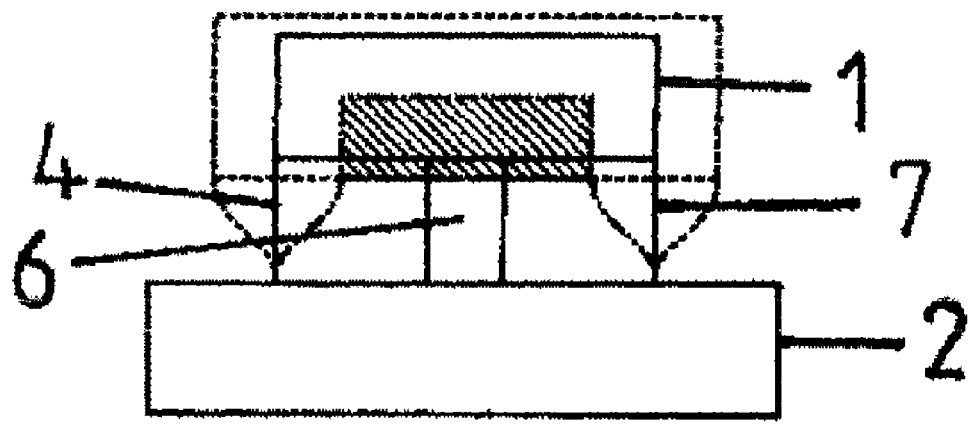

As has already been stated the connecting elements of the state of the art exert a bending moment on the components by virtue of their highly rigid connection. That is prevented by the suspension system according to the invention, as FIG. 4 which substantially corresponds to FIG. 3 diagrammatically particularly clearly shows.

According to the invention the spring elements are highly flexible in a spatial direction while they are relatively rigid in the two directions perpendicular thereto. By virtue of that measure, a change in length of the first component 1 relative to the second component 2 can be accommodated by the flexible spring elements, 4, 5, 6 and 7. Any bending occurs substantially within the spring elements 4, 5, 6, 7 and not within one of the two components 1, 2. The provision of the spring elements 5 and 6 which are quite rigid in the 'soft' direction or the elasticity direction of the spring elements 4, 7 establishes in principle a kind of fixed point 19. That fixed point 19 remains constant in position above the second component 2 by the relatively rigid connection in the direction of the arrow by means of the spring elements 5, 6. The first component 1 expands towards the right and the left from the fixed point 19 or contracts there without the established fixed point 19 changing. In another words inter alia the present invention differs from the state of the art in that the cleverly designed suspension provides that only one point of the first component 1 is fixed in relation to the second component 2 while in the state of the art fixing was effected by way of a plurality of points and thus stresses occurred upon changes in temperature.

By virtue of that arrangement only a slight positional deviation and almost no angular errors are to be found even with major fluctuations in temperature. Tests have shown that the positioning and angular accuracy can be enormously improved by the measure according to the invention.

Figure 5:
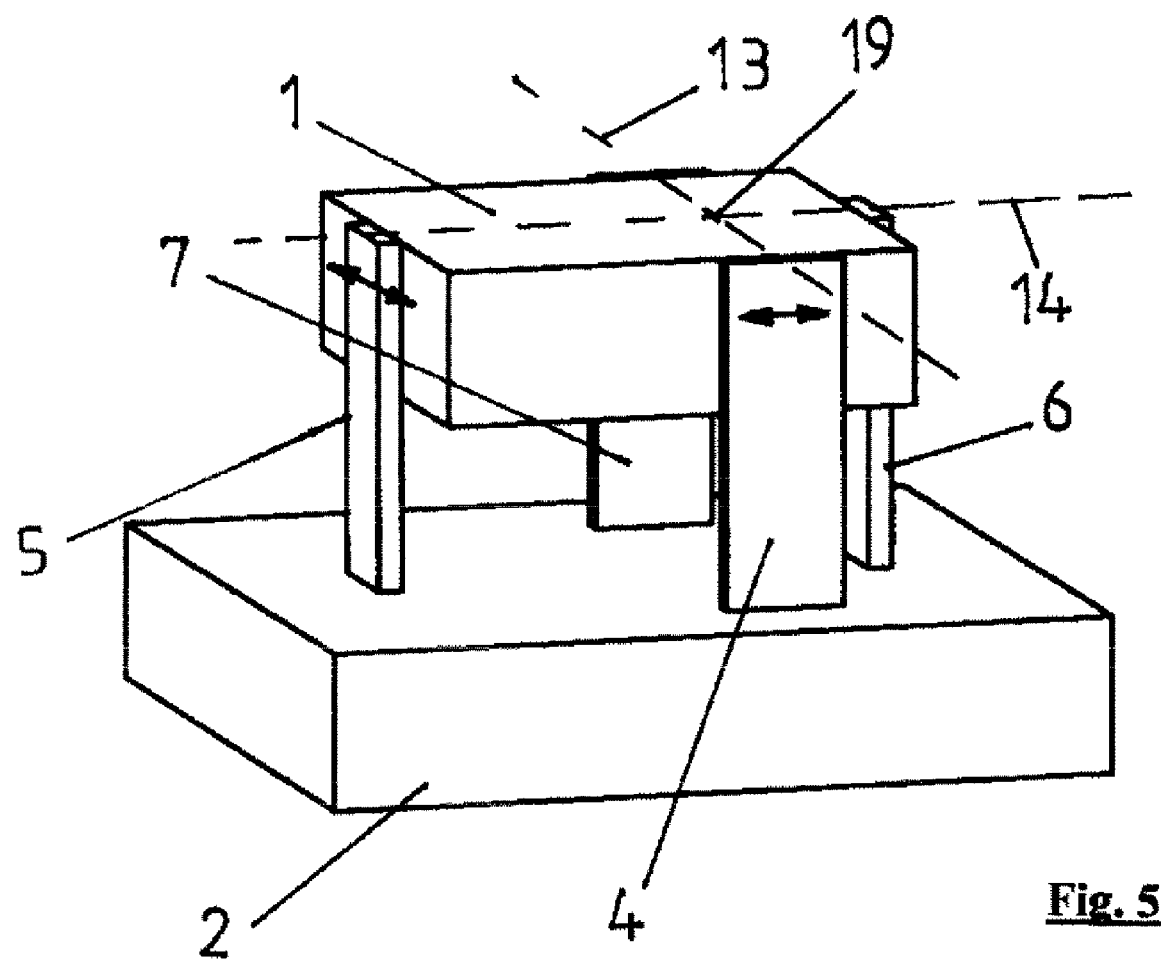
FIG. 5 shows a view of a first embodiment of a connecting element according to the invention.

FIG. 5 shows a first embodiment of the structure according to the invention for the purposes of improved clarification. The Figure shows the first component 1, the second component 2 and four spring elements 4, 5, 6, 7 which connect the two components. Each of those spring elements 4, 5, 6, 7 is so designed that it allows elastic bending of the spring element with respect to the first component 1 in one direction but substantially prevents that in the two directions perpendicular thereto.

For explanatory purposes for example the tongue-shaped spring element 4 shown at the front in FIG. 5 was considered. That spring element allows elastic bending in such a way that the first component 1 can easily move forwardly and rearwardly relative to the second component 2 while bending towards the right or left or from above downwardly is substantially excluded. In other words the two spring elements 4, 7 allow a movement in the direction of the line 13 which is parallel to the second component 2. Instead the two spring elements 5, 6 allow a certain movement along the line 14 while movements in the other directions are substantially prevented. That leads to a fixed point (or pivot point) 19 substantially at the level of the point of intersection of the two lines 13 and 14 so that the first component 1 and the second component 2 are exactly one above the other at the level of that fixed point even when major temperature fluctuations occur. Any lengthwise expansion effects are removed starting from that fixed point in the direction of the lines 13 and 14. It could thus be said that, if the first component 1 were to expand by virtue of an expansion coefficient which is increased in relation to the second component 2, that expansion occurs in the direction of the arrows, starting from the fixed point 19 which is at the point of intersection of the two lines 13, 14. All four spring elements 4, 5, 6, 7 therefore bend somewhat, with the two components 1, 2 remaining substantially exactly in the same angular position relative to each other. The spring elements 4, 5, 6, 7 engage as much as possible at the outside or edge faces of the first component 1. Basically, the further away from each other the engagement points of the spring elements 4, 5, 6, 7 with the same (or parallel) elasticity direction are disposed, the corresponding better is the angular stiffness of the structure.

It will further be seen that the spring elements 4, 5, 6, 7 are not all arranged in the center of the sides afforded by the base surface 9, but the spring elements 4, 7 are displaced somewhat outwardly (towards the right in FIG. 5). The result of this is that the fixed point 19 is not at the center of the first component 1. That measure can be advantageous if, on a component, optical elements which are particularly sensitive to positional errors are not at the center of the component. The fixed point is advantageously disposed precisely where the elements with the greatest sensitivity to incorrect orientation are positioned.

Figure 6:
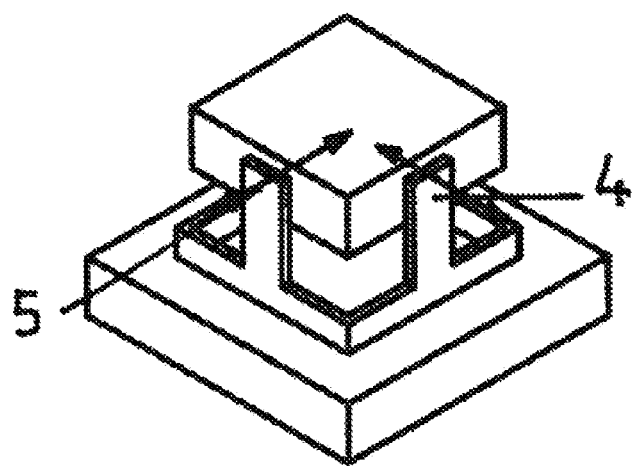
FIG. 6 shows a second embodiment of the structure according to the invention.
Figure 7:
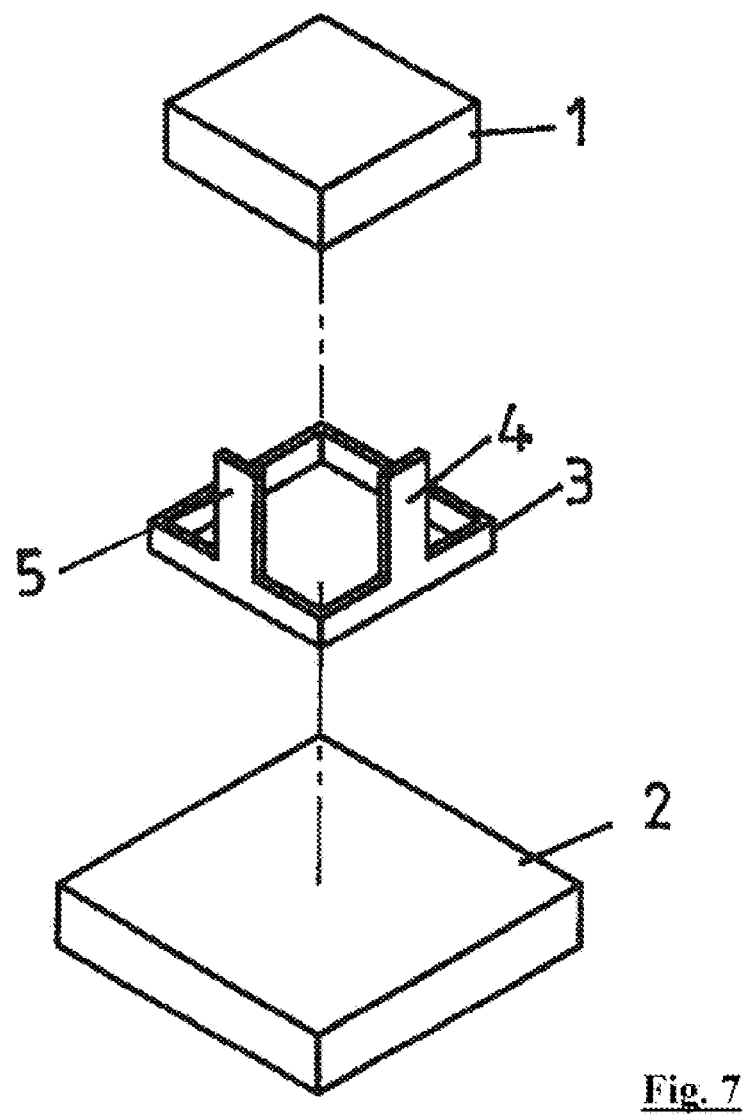
FIG. 7 shows an exploded view of the second embodiment shown in FIG. 6

FIG. 6 shows a second embodiment of a structure according to the invention. FIG. 7 shows an exploded view of FIG. 6. The structure comprises the first component 1, the second component 2 and a connecting element 3 which here has two spring elements 4, 5. The connecting element 3 sits on the surface of the second component 2, that faces the first component 1. The spring elements which extend from a kind of leg come into contact with the edge faces of the first component 1. It is of additional advantage here that the connecting element 3 sits in areal contact on the second component 2. Any component tolerances are compensated by the positioning of the first component 1 in relation to the two spring elements 4, 5. As soon as the first component 1 is positioned relative to the component 2 the connecting element 3 is glued as far as possible simultaneously both to the surface of the second component 2 and also by way of the spring elements 4, 5 to the edge faces of the first component 1. That ensures a completely stress-free rest position. With this structure, the adhesive is not used structurally for determining the spacing of the two components relative to each other, that is to say it does not serve to fill up the gaps caused by adjustment between the connecting element 3 on the one hand and one of the two components 1, 2 on the other hand. It is therefore essential that the spring elements 4, 5 engage the outside or edge faces of a component, more specifically here the first component 1. The first spring element 4 is so designed that, as indicated in FIG. 6, it has a high level of elasticity in the direction of the double-headed arrow, being much greater than the elasticity in the directions perpendicular thereto. In the same manner the spring element 5 also presents a correspondingly anisotropic characteristic, wherein the soft axes, referred to as the elasticity directions, do not extend parallel but in the present case include an angle of about 90°. That kind of connection between the two components permits the optical structure to be exposed to major temperature fluctuations without involving a loss of adjustment of the two components.

Figure 8:
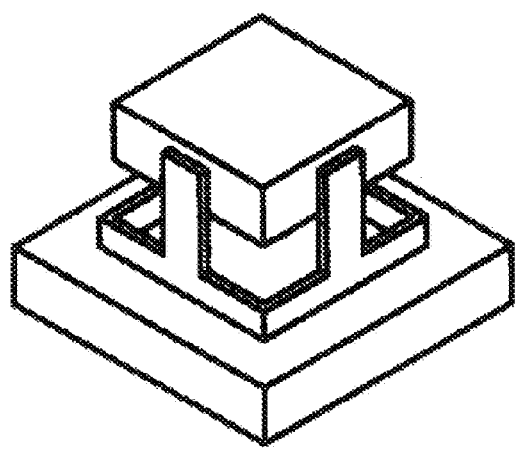
FIG. 8 shows a third embodiment of the structure according to the invention.
Figure 9:
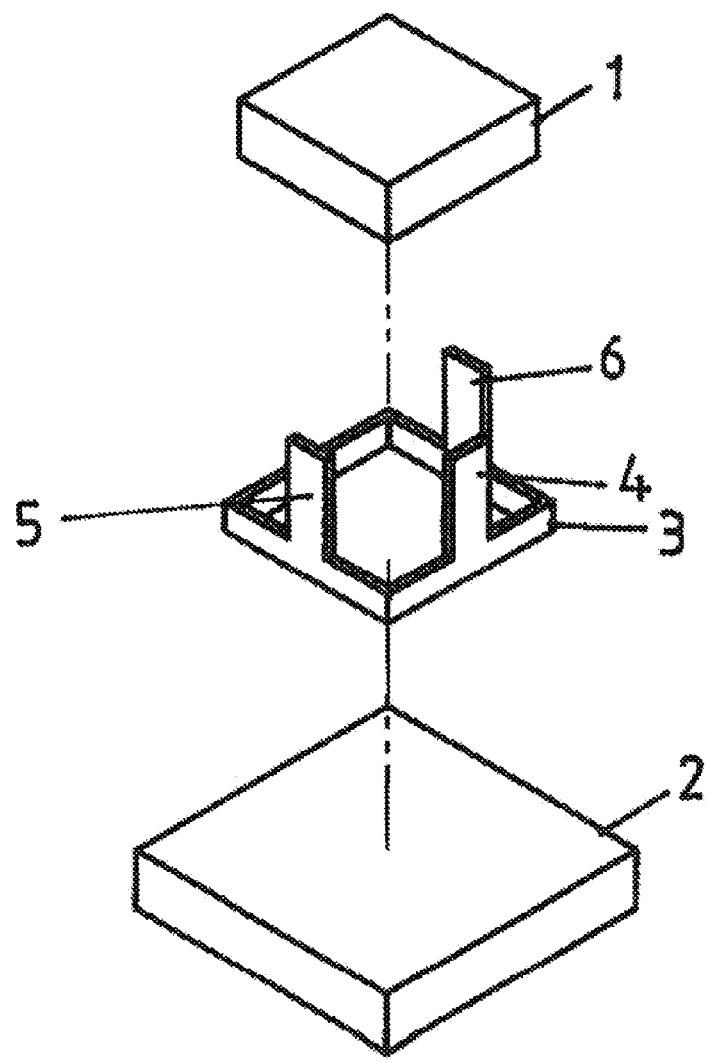
FIG. 9 shows an exploded view of the third embodiment shown in FIG. 8

FIGS. 8 and 9 show a third embodiment in which the connecting element 3 has in total three spring elements 4, 5, 6.

Figure 10:
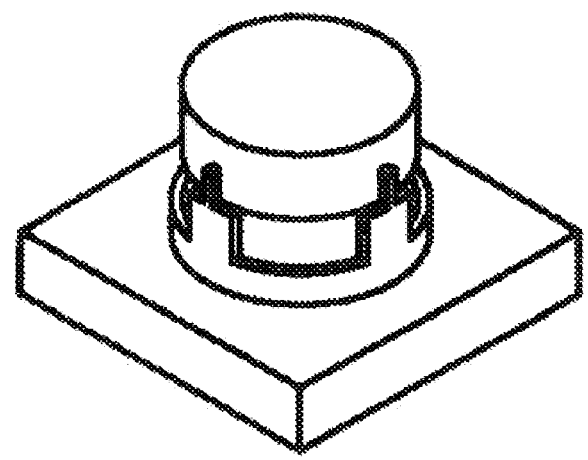
FIG. 10 shows a fourth embodiment of the structure according to the invention.
Figure 11:
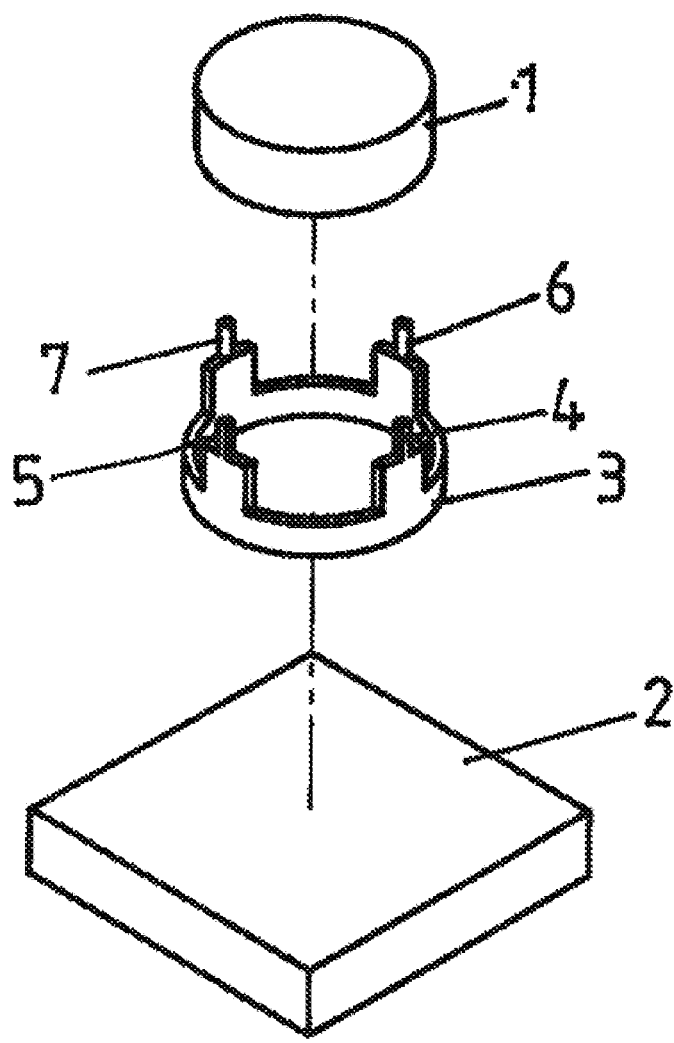
FIG. 11 shows an exploded view of the fourth embodiment shown in FIG. 10

FIGS. 10 and 11 show a fourth embodiment in which the connecting element is round and has a total of four spring elements 4, 5, 6, 7. In principle the connecting element 3 can be of any desired shape which is advantageously adapted to the edge faces of the first component 1 to be positioned over the second component 2.

Figure 12:
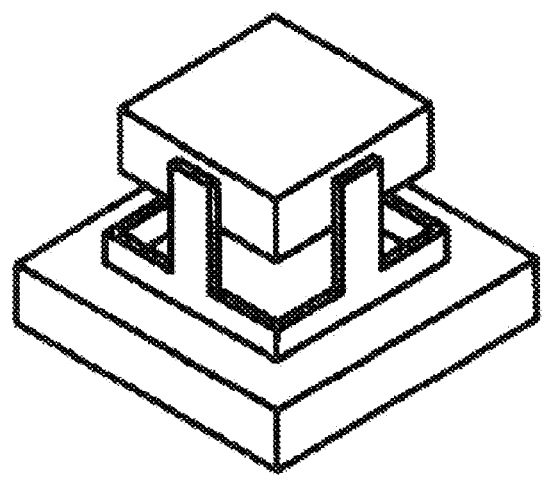
FIG. 12 shows a fifth embodiment of the structure according to the invention.
Figure 13:
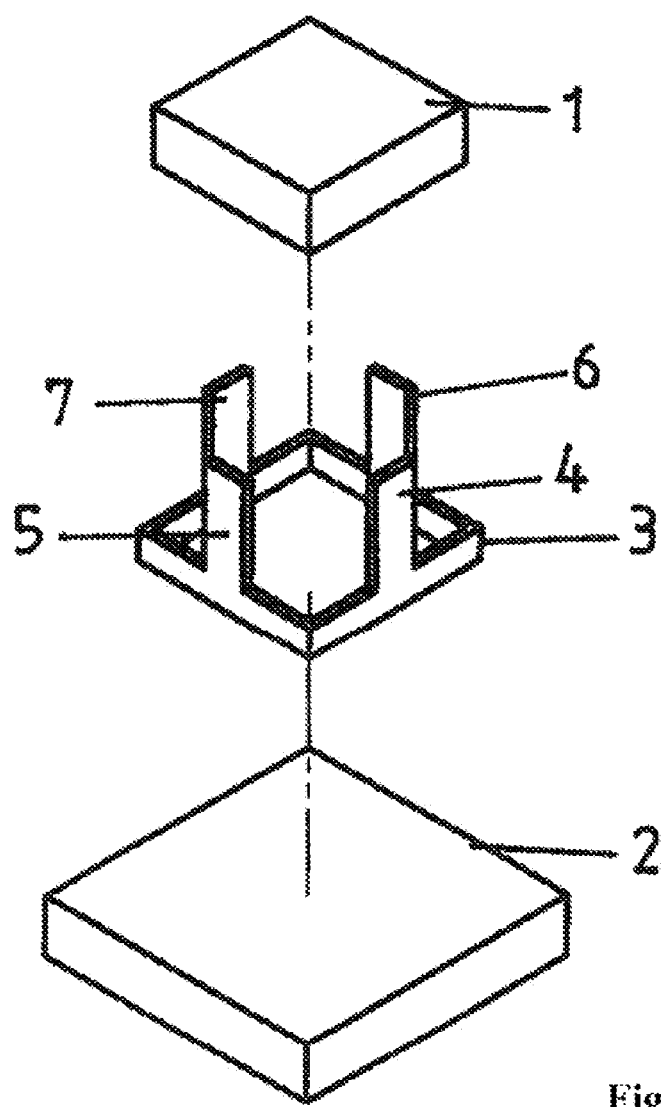
FIG. 13 shows an exploded view of the fifth embodiment shown in FIG. 12

FIGS. 12 and 13 show another example substantially corresponding to the embodiments of FIGS. 6 and 8, with four spring elements 4, 5, 6, 7 also being provided here.

Figure 15:
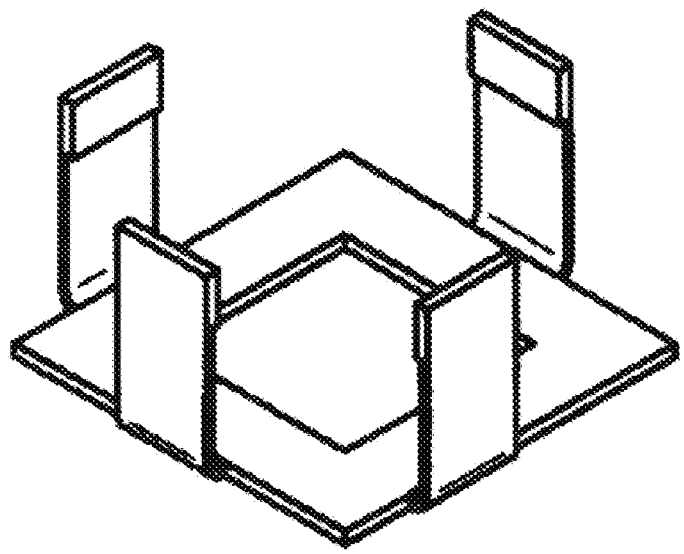
FIG. 15 shows the connecting element of FIG. 14 having spring elements bent upwardly.
Figure 14:
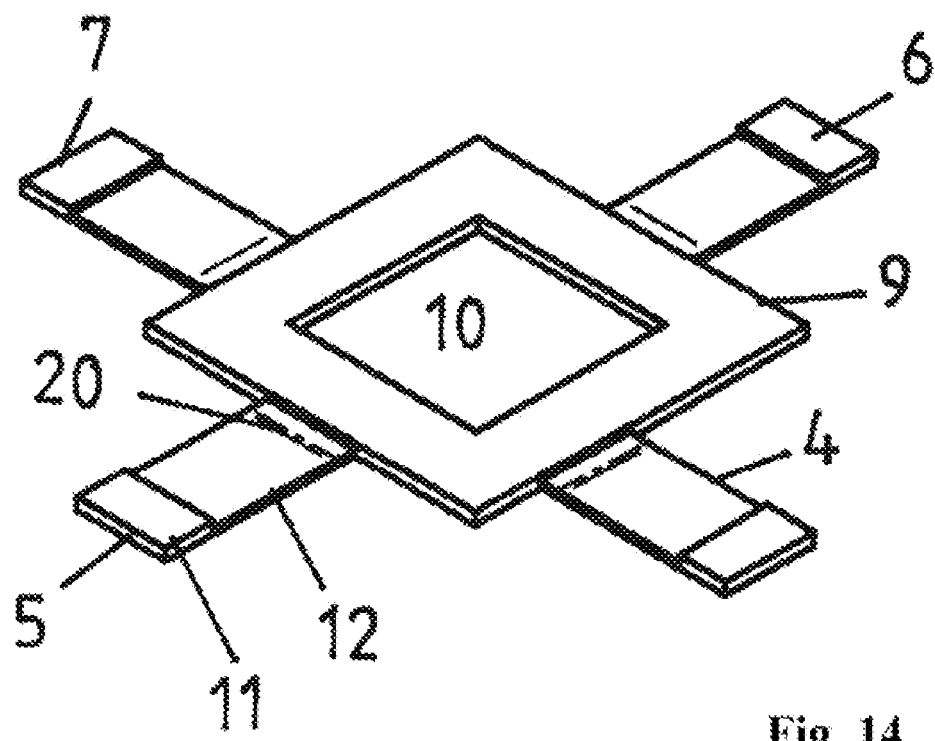
FIG. 14 shows an embodiment of a connecting element of the invention
Figure 16:
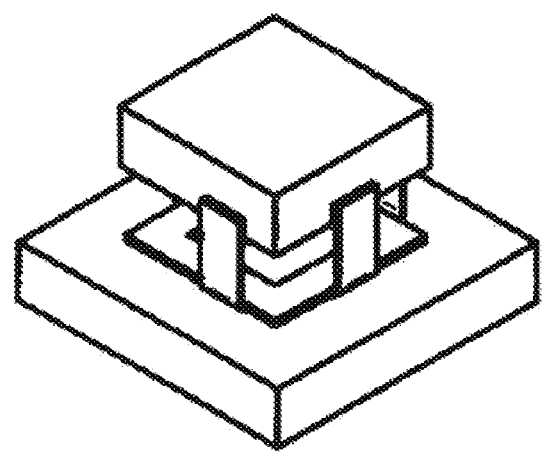
FIG. 16 shows a sixth embodiment of the structure according to the invention.
Figure 17:
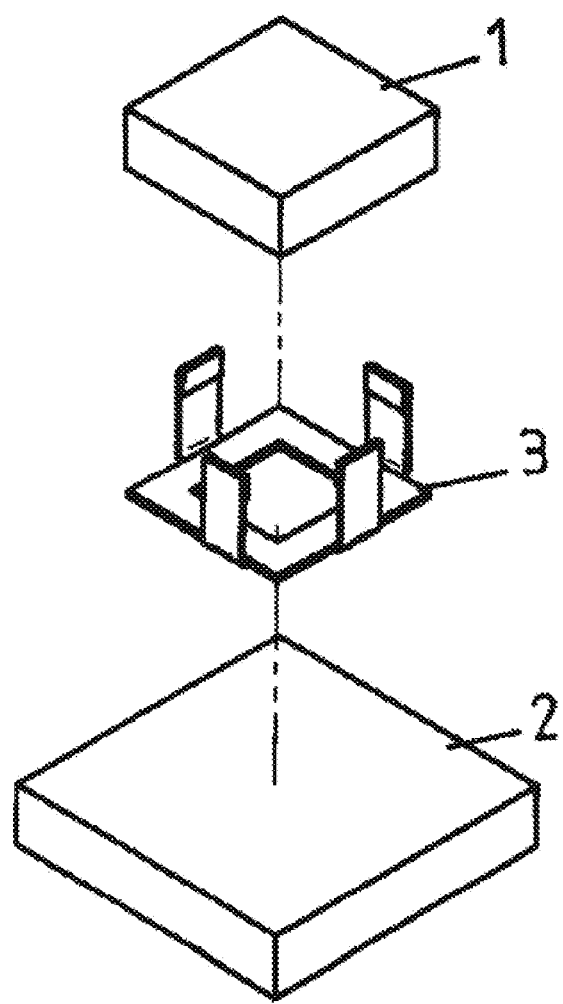
FIG. 17 shows an exploded view of the sixth embodiment shown in FIG. 16.

FIG. 14 shows an embodiment of a connecting element 3. The connecting element 3 is here in the form of an etched portion and is made from metal. The connecting element 3 has a substantially square base surface 9, the square base surface 9 has an also square opening 10. Four spring elements 4, 5, 6, 7 are connected to the square base surface 9. The spring elements 4, 5, 6, 7 are each of a tongue-like or pronged form and have a contact portion 11 and a particularly flexible portion 12 of a reduced thickness in relation to the contact portion 11. As can be seen in FIG. 15 the four spring elements 4, 5, 6, 7, after production using an etching process, are simply bent upwardly so that the spring elements 4, 5, 6, 7 include a substantially right angle to the base surface 9. FIGS. 16 and 17 show an exploded view and a perspective view of the assembled structure, illustrating how the individual parts are connected together. This embodiment of the connecting element 3 has the advantage that the connecting element 3 can be securely fixed to the surface of the second component 2 by virtue of the large base surface 9. It suffers from the disadvantage however that the spring elements 4, 5, 6, 7 become relatively soft by virtue of the spring elements 4, 5, 6, 7 being bent over relative to the base surface 9 at the bend line 20 so that the spring elements cannot completely prevent a movement of the first component 1 towards or away from the second component 2. It will be seen in FIG. 16 that the spring elements 4, 5, 6, 7 each bear with their contact surface 11 against the edge face of the first component 1. This connecting element provides that almost the entire spacing between the two components 1 and 2 can be used for the spring elements 4, 5, 6, 7 as the base surface 9 is of a very shallow structure.

Figure 19:
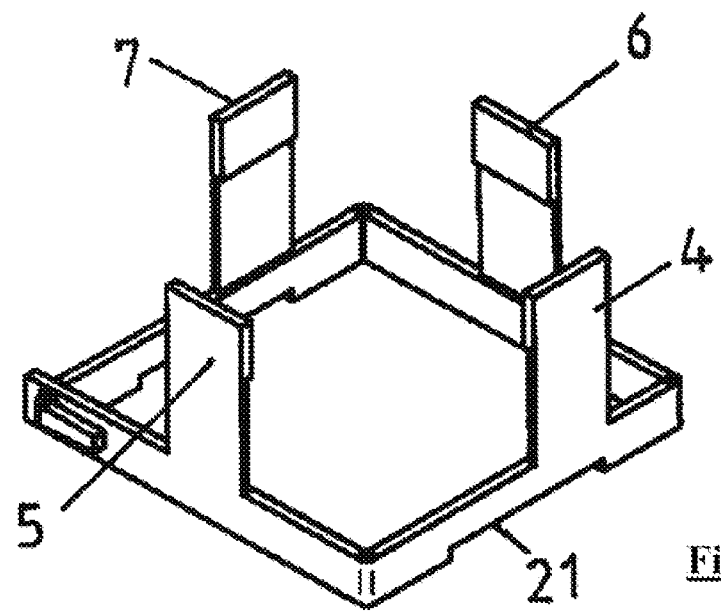
FIG. 19 shows the connecting element of FIG. 18 in the form of a rectangle.
Figure 18:
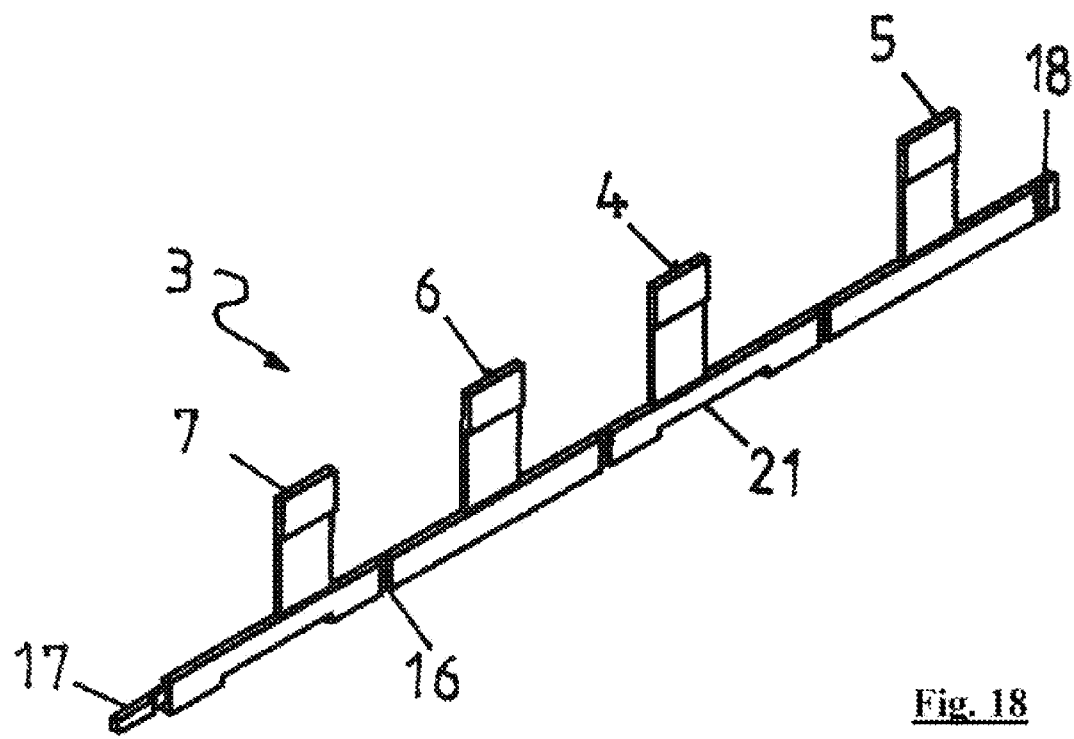
FIG. 18 shows a second embodiment of a connecting element of the invention.
Figure 20:
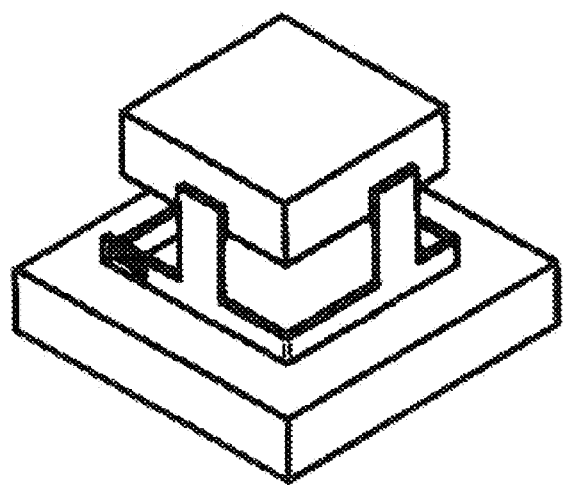
FIG. 20 shows a seventh embodiment of the structure according to the invention.
Figure 21:
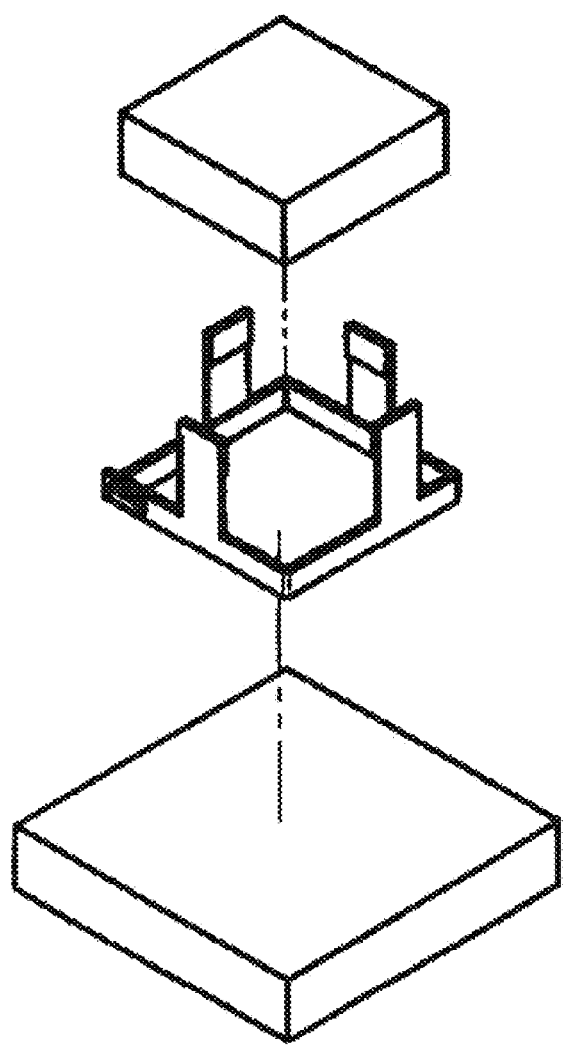
FIG. 21 shows an exploded view of the seventh embodiment shown in FIG. 20.

FIG. 18 shows a further embodiment of a connecting element 3 according to the invention. That connecting element 3 comprises a leg 15 and four spring elements 4, 5, 6, 7 which extend therefrom and which once again each have a contact portion 11 and an adjoining portion of a thickness which is reduced in relation to the contact portion 11. The leg 15 has desired-bend locations 16 and a closure bending mechanism 17, 18 so that the leg shown in FIG. 18 can be bent at the desired-bend locations 16 to form a rectangle or a square, as shown in FIG. 19. FIGS. 20 and 21 shows a perspective view and an exploded view to illustrate how this embodiment of the connecting element 3 is used for positioning and fixing two components. The connecting element shown in FIGS. 18 through 21 has the advantage over the connecting element shown in FIGS. 14 through 17 that the spring elements 4, 5, 6, 7 are rigid in the perpendicular direction, that is to say upon a movement of the first component 1 towards or away from the second component 2. Instead however it has a smaller contact surface on the surface of the second component 2. The contact surface of the leg 15 on the surface of the component 2 can be still further reduced if the leg has openings 21. In principle the leg 15 could also be of such a configuration that it sits on the surface of the second component essentially only at three points. The smaller contact surface has the advantage that the connecting element has a better support position.

The structure according to the invention, using simple means, permits fixing of two components in such a way as to be oriented markedly more easily. The components can be oriented relative to each other in all six degrees of freedom (three translatory and three rotational). The proposed elastic suspension system also has the advantage that it affords a very high level of positional and angular accuracy even with major temperature fluctuations, in particular if the two mutually oriented components have different expansion coefficients.

List Of References
1 first component
2 second component
3 connecting element
4 spring element
5 spring element
6 spring element
7 spring element
8 adhesive
9 square base surface
10 square opening
11 contact portion
12 flexible portion
13,14 lines
15 leg
16 desired-bend locations
17 closure mechanism
18 closure mechanism
19 fixed point (pivot point)
20 bend line
21 opening

The invention claimed is:

1. A structure comprising a first and a second component (1, 2) and a connecting element comprising a leg frame (3) and at least two spring elements extending from said leg frame, wherein said leg frame defines an opening, wherein said connecting element connects said first and second components (1, 2), wherein the connecting element is unitary and each spring element (4, 5, 6, 7) has a spring constant which is at least twice as great in two respective mutually perpendicular spatial directions as in the third spatial direction perpendicular to the first two spatial directions, referred to as the elasticity direction, wherein each of the at least two spring elements has an elasticity direction and the elasticity directions of two of the at least two spring elements do not extend parallel to each other,
wherein the first component (1) has a surface facing towards a surface of said second component (2) and one or more edge faces adjoining said surface of said first component that faces said surface of said second component, wherein the spring elements (4, 5, 6, 7) are connected to said one or more edge faces of said first component, and wherein said leg frame is placed on and connected to said surface of said second component while said spring elements extending from said leg frame hold said first component above said leg frame and over said second component.

2. A structure as set forth in claim 1, wherein said first and second components (1, 2) have different thermal expansion coefficients.

3. A structure as set forth in claim 1 or claim 2 wherein the angle between the elasticity direction of each of the at least two spring elements is between 50° and 130°.

4. A structure as set forth in claim 1 or claim 2 having at least three spring elements (4, 5, 6), wherein the elasticity directions of the three spring elements (4, 5, 6) lie substantially in one plane.

5. A structure as set forth in claim 4, wherein the angle between the elasticity direction of any two of said spring elements is between 100° and 140°.

6. A structure as set forth in one of claims 1 through 2 having at least four spring elements (4, 5, 6, 7), and wherein the elasticity directions of the four spring elements (4, 5, 6, 7) lie substantially in one plane.

7. A structure as set forth in claim 6, wherein the at least four spring elements (4, 5, 6, 7) include a first pair of spring elements having substantially parallel elasticity directions and a second pair of spring elements having substantially parallel elasticity directions, wherein the angle between the elasticity directions of the first and second pair of spring elements is between 50° and 130°.

8. A structure as set forth in claim 6, wherein the at least four spring elements (4, 5, 6, 7) includes a first pair of spring elements having substantially parallel elasticity directions and a second pair of spring elements also having substantially parallel elasticity directions, wherein the angle between the elasticity directions of the first and second pair of spring elements is between 70 and 110°.

9. A structure as set forth in claim 6, wherein the at least four spring elements (4, 5, 6, 7) includes a first pair of spring elements having substantially parallel elasticity directions and a second pair of the spring elements also having substantially parallel elasticity directions, wherein the angle between the elasticity directions of the first and second pair of spring elements is between 85 and 95°.

10. A structure as set forth in one of claims 1 through 2, wherein the connecting element (3) is an etched portion.

11. A structure as set forth in one of claims 1 through 2, wherein the spring elements (4, 5, 6, 7) are of metal.

12. A structure as set forth in one of claims 1 through 2, wherein the spring elements (4, 5, 6, 7) are fixed by adhesive or welded to the one or more edge faces of the first component (1).

13. A structure as set forth in one of claims 1 through 2, wherein the connecting element (3) comprises a substantially square base surface (9) which is connected to the surface of the second component (2) and four prong-shaped spring elements (4, 5, 6, 7) which are angled with respect thereto.

14. A structure as set forth in claim 13, wherein the prong-shaped spring elements (4, 5, 6, 7) have a contact portion (11) which comes into contact with the first component (1) and a portion of a thickness reduced in relation to the contact portion (11).

15. A structure as set forth in one of claims 1 through 2, wherein said at least two spring elements (4, 5, 6, 7) extending from said leg frame are four prong-shaped spring elements.

16. A structure as set forth in one of claims 1 through 2, wherein the spring constant of each spring element (4, 5, 6, 7) in the respective two mutually perpendicular spatial directions is at least ten times as great as the spring constant in the elasticity direction.

17. A structure as set forth in claim 1 or claim 2, wherein the angle between the elasticity direction of each of the at least two spring elements is between 70 and 110°.

18. A structure as set forth in claim 1 or claim 2, wherein the angle between the elasticity direction of each of the at least two spring elements is between 85 and 95°.

19. A structure as set forth in one of claims 1 through 2, wherein the spring constant of each spring element (4, 5, 6, 7) in the respective two mutually perpendicular spatial directions is at least fifty times as great as the spring constant in the elasticity direction.

20. A structure as set forth in one of claims 1 through 2, wherein the spring constant of each spring element (4, 5, 6, 7) in the respective two mutually perpendicular spatial directions is at least one-hundred times as great as the spring constant in the elasticity direction.

21. A method of producing a structure as set forth in one of claims 1 through 2, wherein firstly the connecting element is positioned on the second component, then the first component is oriented relative to the second component and finally the connecting element is connected both to the first and also the second component.

22. A method as set forth in claim 21, wherein the connection of the connecting element on the one hand and the component on the other hand is effected by means of adhesive.

23. A method as set forth in claim 22, wherein the first component is so oriented that the spring elements of the connecting element come to lie in the immediate proximity with the edge surfaces of the first component and the spring elements are fixed to the edge faces of the first component.

24. A method as set forth in claim 23, wherein the first component is so oriented that the spring elements do not touch the edge faces of the first component and upon connecting the spring element and the edge face the gap which has remained is filled with adhesive.

25. A method as set forth in claim 21, wherein when positioning the first component with respect to the second component the first component together with the connecting element is displaced on the surface of the second component until the desired position is reached.

* * * * *